(12) United States Patent
Ng et al.

(10) Patent No.: US 7,883,743 B2
(45) Date of Patent: Feb. 8, 2011

(54) SACRIFICIAL COATING FOR FLUORIDE ION CLEANING

(75) Inventors: Sor Tin Ng, Singapore (SG); Eng Soon Ang, Singapore (SG); Seng Wee Neo, Singapore (SG); Chee Kin Woo, Singapore (SG); Tian Siang Jason Kong, Singapore (SG)

(73) Assignee: United Technologies Corporation, Hartford, CT (US)

( * ) Notice: Subject to any disclaimer, the term of this patent is extended or adjusted under 35 U.S.C. 154(b) by 1421 days.

(21) Appl. No.: 11/295,831

(22) Filed: Dec. 7, 2005

(65) Prior Publication Data

US 2007/0087208 A1    Apr. 19, 2007

(51) Int. Cl.
  *C23C 16/00* (2006.01)
  *B05D 3/00* (2006.01)
  *B32B 43/00* (2006.01)
(52) U.S. Cl. .............................. 427/248.1; 427/255.11; 427/140
(58) Field of Classification Search .............. 427/248.1, 427/255.11, 140
  See application file for complete search history.

(56) References Cited

U.S. PATENT DOCUMENTS

| 4,008,844 A | | 2/1977 | Duvall |
| 4,073,639 A | | 2/1978 | Duvall |
| 4,098,450 A | * | 7/1978 | Keller et al. ................. 228/119 |
| 5,373,986 A | | 12/1994 | Rafferty et al. |
| 5,549,767 A | | 8/1996 | Pietruska |
| 5,672,261 A | * | 9/1997 | Wheat et al. ................. 205/206 |
| 5,806,751 A | | 9/1998 | Schaefer |
| 6,253,441 B1 | * | 7/2001 | Wheat et al. ................ 29/527.2 |
| 6,367,687 B1 | | 4/2002 | Reeves et al. |
| 6,645,926 B2 | * | 11/2003 | Abriles et al. ................ 510/257 |
| 2004/0005410 A1 | * | 1/2004 | Seidel .................... 427/255.28 |

OTHER PUBLICATIONS

Search Report Apr. 7, 2006.

* cited by examiner

*Primary Examiner*—Bret Chen
*Assistant Examiner*—Kelly M Gambetta
(74) *Attorney, Agent, or Firm*—Carlson, Gaskey & Olds PC

(57) ABSTRACT

A method of repairing a defect in a gas turbine engine component includes exposing the defect to a chemically reducing gas to clean the defect surface of undesired particles and oxidation. Before the cleaning, a protective coating is applied to the defect surface to resist inter-granular attack during the cleaning process.

23 Claims, 1 Drawing Sheet

SACRIFICIAL COATING FOR FLUORIDE ION CLEANING

RELATED APPLICATIONS

This application claims priority to Singapore Patent Application No. 200506795-4, filed Oct. 18, 2005.

BACKGROUND OF THE INVENTION

This invention relates to a method for repairing defects in gas turbine engine components and, more particularly, to utilizing a protective coating to resist inter-granular attack during chemical cleaning.

Conventional gas turbine engines include components such as high and low pressure turbine vanes that operate for extended periods of time under relatively harsh conditions. Under such conditions, the gas turbine engine components may incur damage from erosion, creep, and high cycle fatigue that results in defects such as cracks. Typically, the defects can be repaired to extend the service life of the gas turbine engine component.

Conventional repair methods include cleaning the defect to remove oxidation and particles that may hamper the repair. After the cleaning, a braze material such as a braze filler powder is applied near the defect. The gas turbine engine component is then heated to melt the braze material and fill in the defect portion.

Conventional cleaning processes include using hydrogen fluoride gas to reduce oxidation on the defect surface and transform undesired particles into volatile fluorides that are then carried away by hydrogen gas. Disadvantageously, the hydrogen fluoride gas preferentially attacks grain boundaries of a metallic microstructure of the gas turbine engine component, which may undesirably weaken the gas turbine engine component, lead to unsuccessful repair, and result in scrappage of the component.

Accordingly, there is a need for a method of cleaning gas turbine engine component defects while minimizing the possibility of inter-granular boundary attack.

SUMMARY OF THE INVENTION

The present invention provides a method of repairing a defect in a gas turbine engine component. The defect has a defect surface that includes grain boundaries. The defect is exposed to a chemically reducing gas to clean the defect surface of undesired particles and oxidation. Before the cleaning, a protective coating is applied to the defect surface to protect the grain boundaries from chemical attack. The protective coating functions as a sacrificial layer such that the chemically reducing gas preferentially attacks the protective coating rather than the grain boundaries.

The example method of repairing a defect in a gas turbine engine component therefore provides the benefit of minimizing inter-granular attack during chemical cleaning.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
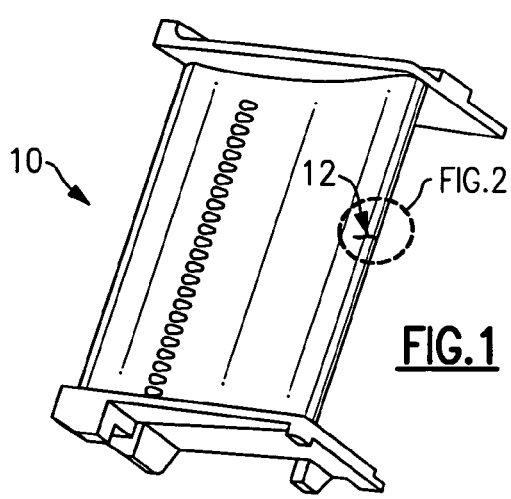
FIG. 1 shows an example gas turbine engine component having a defect.

FIG. 1 illustrates selected portions of an example gas turbine engine component 10 such as a turbine vane. In this example, the gas turbine engine component 10 includes a defect portion 12, such as a microscopic crack.

Figure 2:
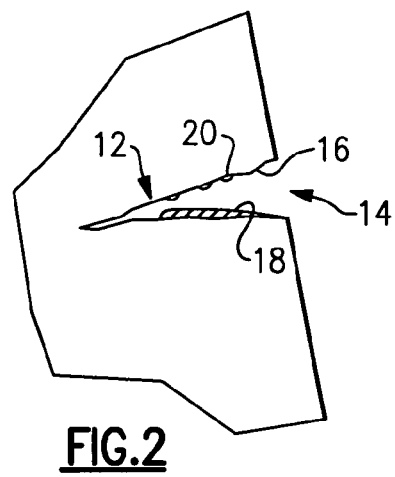
FIG. 2 shows a closer view of the defect of the gas engine component shown in FIG. 1.

FIG. 2 shows the defect portion 12 illustrated in FIG. 1. The defect portion 12 includes a crack 14 having a crack surface 16 with undesired impurities such as an oxide scale 18 and particles 20. The particles 20 may be, for example, titanium or aluminum based which, and under some conditions may form undesired oxides.

Figure 3:
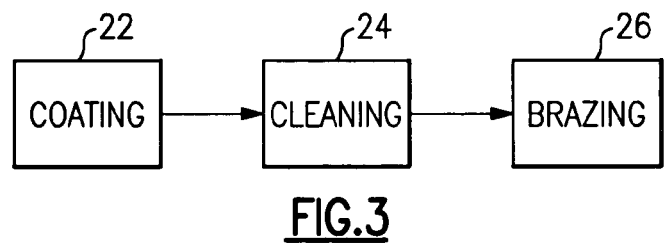
FIG. 3 illustrates steps of a gas turbine engine component repair process.

FIG. 3 illustrates steps used to repair the crack 14. Generally, the method includes a coating step 22, a cleaning step 24, and a brazing step 26. The crack 14 is coated in step 22 to resist inter-granular attack during the cleaning process. The crack 14 is then exposed to a cleaning gas such as hydrogen fluoride in step 24 to remove the oxidation scale 18 and undesired particles 20. Finally, in step 26 the crack 14 is filled with a braze material and heated in a known manner to repair the crack 14. These steps will be described in more detail below.

Figure 4:
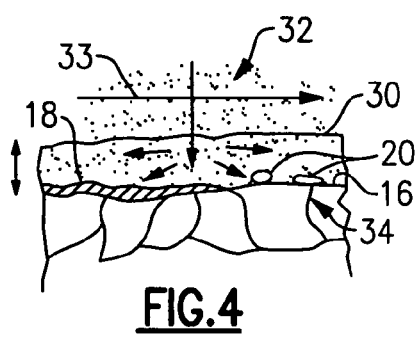
FIG. 4 illustrates a chemically reducing gas diffusing through a protective coating that is applied to a defect surface of a crack of a gas turbine engine component.

FIG. 4 shows a more detailed view of the crack surface 16, oxidation scale 18, and several undesired particles 20. The term "particle" refers generally to regions of undesired oxide-forming metals. In step 22, a protective coating 30 is deposited on the crack surface 16 by vapor deposition, electroplating, or other known method.

During the cleaning step 24, the gas turbine engine component 10 is heated at a temperature between approximately 900° C. and 1100° C., and exposed to a chemically reducing gas 32 such as hydrogen fluoride. The chemically reducing gas 32 diffuses through the protective coating 30 and chemically reacts with the oxidation scale 18 and undesired particles 20. In one example, the oxidation scale 18 includes aluminum oxide and the chemically reducing gas 32 reacts with the aluminum oxide as illustrated in the following example reaction equation:

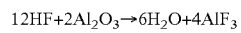

$$12HF + 2Al_2O_3 \rightarrow 6H_2O + 4AlF_3$$

The resulting water and aluminum fluoride are volatile materials that then diffuse out of the protective coating and are carried away by a purge gas flow 33, such as hydrogen. The chemically reducing gas 32 also reacts with the undesired particles 20 such as aluminum and titanium as illustrated by the following example reaction equations:

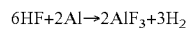

$$6HF + 2Al \rightarrow 2AlF_3 + 3H_2$$

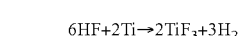

$$6HF + 2Ti \rightarrow 2TiF_3 + 3H_2$$

The resulting aluminum fluoride and titanium fluoride are volatile materials that then diffuse out of the protective coating and are carried away by the purge gas flow 33. The reactions between the chemically reducing gas 32, the aluminum oxide, the aluminum, and the titanium, for example, are controlled by controlling the heating temperature, time, and hydrogen fluoride concentration. In one example, use of the protective coating 30 does not change the temperature, time, and hydrogen fluoride concentration previously known and used for defect repair.

Figure 5:
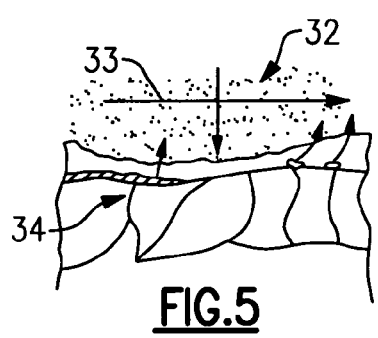
FIG. 5 shows the chemically reducing gas depleting the protective coating shown in FIG. 4.

As shown in FIG. 5, the hydrogen fluoride chemically reducing gas 32 also reacts with the protective coating 30 to deplete the protective coating 30. The protective coating 30 has an oxidation resistance higher than an oxidation resistance of the gas turbine engine component 10 material and grain boundaries 34. This provides a benefit of utilizing the protective coating 30 as a sacrificial layer that the chemically reducing gas 32 preferentially attacks rather than grain boundaries 34 at the defect surface 16.

Figure 6:
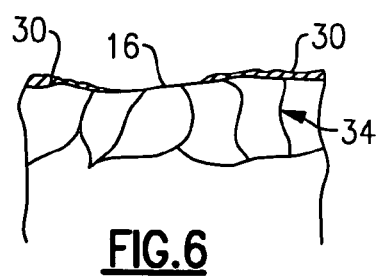
FIG. 6 shows the defect surface of a gas turbine engine component after the cleaning process.

A portion of the protective coating 30 may remain on the defect surface 16 after the chemical cleaning (FIG. 6). Alternatively, the chemically reducing gas 32 may completely deplete the protective coating 30 during the cleaning process. Once the protective coating 30 is completely depleted, however, the chemically reducing gas 32 may preferentially begin to attack the grain boundaries 34 of the defect surface 16.

In one example, the protective coating 30 is a nickel material that is deposited with a thickness between 0.0005" and 0.0008". In another example, the protective coating 30 includes a chromium material deposited with a thickness between 0.0006" and 0.0015".

These example protective coatings 30 and thicknesses provide resistance to inter-granular attack and are depleted during the cleaning step 24 to achieve a clean crack surface 16 that is relatively free of impurities. Given this description, however, one of ordinary skill would recognize other suitable protective coatings and thicknesses for use with hydrogen fluoride or other cleaning gases.

The volatile materials carried away by the purge gas flow 33 such as aluminum fluoride, titanium fluoride may later be neutralized in a fume scrubber with a neutralizing chemical such as caustic soda (NaOH).

Figure 7:
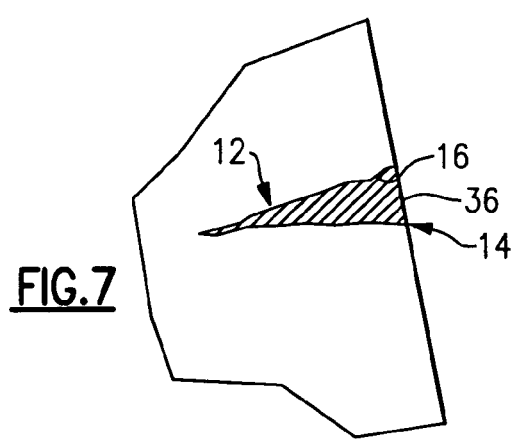
FIG. 7 shows the defect after a brazing process.

Once the crack 14 has been cleaned and the oxidation scale 18 and undesired particles 20 have been removed, the crack 14 is filled with a braze material 36 and heated in a known brazing process to complete the repair as shown in FIG. 7.

The disclosed example method provides a protective coating 30 that acts as a sacrificial layer to resist inter-granular attack between a hydrogen fluoride chemically reducing gas and grain boundaries 34 of a defect surface 16 of a gas turbine engine component 10. This provides the benefit of minimizing inter-granular attack that may otherwise lead to scrapping of the gas turbine engine component 10 rather than repair.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of repairing a defect in a gas turbine engine component, comprising:
   (a) depositing a sacrificial coating on a defect surface of a defect in a gas turbine engine component;
   (b) exposing the defect and sacrificial coating to a chemically reducing gas to clean the defect surface; and
   (c) depleting the sacrificial coating with the chemically reducing gas to resist chemical reaction between the chemically reducing gas and grain boundaries of the gas turbine engine component.

2. The method as recited in claim 1, including depositing the sacrificial coating of step (a) before exposing the defect to the chemically reducing gas in step (b).

3. The method as recited in claim 1, wherein step (a) includes depositing a chromium sacrificial coating.

4. The method as recited in claim 3, wherein step (a) includes depositing the chromium sacrificial coating with a thickness between about 0.0006 inches and about 0.0015 inches.

5. The method as recited in claim 1, wherein step (a) includes depositing a nickel sacrificial coating.

6. The method as recited in claim 5, wherein step (a) includes depositing the nickel sacrificial coating with a thickness between about 0.0005 inches and about 0.0008 inches.

7. The method as recited in claim 1, wherein step (a) includes depositing the sacrificial coating by electroplating.

8. The method as recited in claim 1, wherein step (a) includes depositing the sacrificial coating by vapor deposition.

9. The method as recited in claim 1, wherein step (b) includes heating the defect at a temperature between about 900° C. and about 1100° C., and exposing the defect to hydrogen fluoride gas.

10. The method as recited in claim 9, including step (d) diffusing the hydrogen fluoride gas through the sacrificial coating to remove undesired surface particles from the defect surface.

11. The method as recited in claim 1, including step (d) brazing the defect to fill the defect.

12. The method as recited in claim 1, wherein the grain boundaries include a first oxidation resistance and the sacrificial coating includes a second oxidation resistance that is higher than the first oxidation resistance.

13. The method as recited in claim 1, wherein step (c) includes preferentially chemically attacking the sacrificial coating over the grain boundaries.

14. The method as recited in claim 1, wherein step (c) includes partially depleting the sacrificial coating such that some of the sacrificial coating remains after exposure to the chemically reducing gas.

15. The method as recited in claim 1, wherein the defect is a micro crack and the surface is within the micro crack.

16. The method as recited in claim 1, wherein the sacrificial coating is a single layer.

17. The method as recited in claim 1, wherein the defect surface includes an oxide.

18. The method as recited in claim 17, wherein the oxide is an oxide scale.

19. A method of repairing a defect in a gas turbine engine component, comprising:
   (a) exposing a defect having a defect surface that includes grain boundaries to a chemically reducing gas to clean the defect surface; and
   (b) depositing a sacrificial coating on the defect surface to resist chemical reaction between the chemically reducing gas and the grain boundaries.

20. The method as recited in claim 19, including step (c) of depleting the sacrificial coating to resist chemical reaction between the chemically reducing gas and the grain boundaries.

21. The method as recited in claim 19, wherein the grain boundaries include a first oxidation resistance and the sacrificial coating includes a second oxidation resistance that is higher than the first oxidation resistance.

22. The method as recited in claim 19, wherein the defect surface includes an oxide.

23. The method as recited in claim 22, wherein the oxide is an oxide scale.

* * * * *